US007912915B1

(12) United States Patent　　(10) Patent No.: US 7,912,915 B1
Brin　　(45) Date of Patent: Mar. 22, 2011

(54) SYSTEMS AND METHODS FOR ENTICING USERS TO ACCESS A WEB SITE

(75) Inventor: Sergey Brin, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 2618 days.

(21) Appl. No.: 09/843,923

(22) Filed: Apr. 30, 2001

Related U.S. Application Data

(60) Provisional application No. 60/200,957, filed on May 1, 2000.

(51) Int. Cl.
*G06F 15/167* (2006.01)
(52) U.S. Cl. .................................................. 709/216
(58) Field of Classification Search .......... 345/730, 345/473, 738; 709/204, 216; 705/26
See application file for complete search history.

(56) References Cited

U.S. PATENT DOCUMENTS

| | | | | |
|---|---|---|---|---|
| 5,105,184 | A | * | 4/1992 | Pirani et al. .................. 345/629 |
| 5,873,080 | A | * | 2/1999 | Coden et al. ...................... 707/3 |
| 5,884,309 | A | * | 3/1999 | Vanechanos, Jr. ............. 707/10 |
| 5,913,040 | A | * | 6/1999 | Rakavy et al. ................ 709/232 |
| 5,978,807 | A | * | 11/1999 | Mano et al. ...................... 707/10 |
| 5,995,105 | A | * | 11/1999 | Reber et al. .................... 345/835 |
| 6,034,652 | A | * | 3/2000 | Freiberger et al. ............ 345/730 |
| 6,072,480 | A | * | 6/2000 | Gorbet et al. ................. 345/730 |
| 6,081,262 | A | * | 6/2000 | Gill et al. ...................... 715/500.1 |
| 6,119,135 | A | * | 9/2000 | Helfman ........................ 715/513 |
| 6,166,735 | A | * | 12/2000 | Dom et al. ..................... 345/749 |
| 6,247,047 | B1 | * | 6/2001 | Wolff ............................. 709/219 |
| 6,264,555 | B1 | * | 7/2001 | Glazman et al. .................. 463/1 |
| 6,317,740 | B1 | * | 11/2001 | Mukherjea et al. .............. 707/4 |
| 6,396,500 | B1 | * | 5/2002 | Qureshi et al. ................ 345/473 |
| 6,457,009 | B1 | * | 9/2002 | Bollay ............................ 707/10 |
| 6,519,584 | B1 | * | 2/2003 | Tognazzini et al. .............. 707/3 |
| 6,560,637 | B1 | * | 5/2003 | Dunlap et al. ................ 709/204 |
| 6,879,586 | B2 | * | 4/2005 | Miloslavsky et al. ......... 370/356 |
| 6,999,959 | B1 | * | 2/2006 | Lawrence et al. ................ 707/5 |
| 2002/0044103 | A1 | * | 4/2002 | Paulson ......................... 345/1.1 |
| 2002/0055880 | A1 | * | 5/2002 | Unold et al. .................... 705/26 |
| 2002/0065741 | A1 | * | 5/2002 | Baum ............................. 705/26 |

OTHER PUBLICATIONS

Yahoo! Main page, Dec. 23, 1996; http://web.archive.org/web/19961223150621/http://www8.yahoo.com accessed May 7, 2006.*
Google; Google Holiday Logos; www.google.com/holidaylogos; pp. 1-8; 2001 (print date).
Google; Mentalplex; www.google.com/holidaylogos; pp. 1-4; Apr. 1, 2000.

* cited by examiner

*Primary Examiner* — Kevin Bates
*Assistant Examiner* — Benjamin Ailes
(74) *Attorney, Agent, or Firm* — Harrity & Harrity, LLP (57) ABSTRACT

A system provides a periodically changing story line and/or a special event company logo to entice users to access a web page. For the story line, the system may receive objects that tell a story according to the story line and successively provide the objects on the web page for predetermined or random amounts of time. For the special event company logo, the system may modify a standard company logo for a special event to create a special event logo, associate one or more search terms with the special event logo, and upload the special event logo to the web page. The system may then receive a user selection of the special event logo and provide search results relating to the special event.

4 Claims, 10 Drawing Sheets

FIG. 10

SYSTEMS AND METHODS FOR ENTICING USERS TO ACCESS A WEB SITE

RELATED APPLICATION

This application claims priority under 35 U.S.C. §119(e) based on U.S. Provisional Application Ser. No. 60/200,957, filed May 1, 2000, the disclosure of which is incorporated herein by reference.

BACKGROUND OF THE INVENTION

1. Field of the Invention

The present invention relates generally to client-server networks and, more particularly, to systems and methods that provide mechanisms for attracting users to a site on a network.

2. Description of Related Art

Today, many operators of web sites on the Internet use animated images, such as animated Graphic Interchange Format (GIF) images, in web pages to make the web pages more dynamic and visually appealing to users. The philosophy is that if the web pages are visually appealing, then the users will visit the web site often.

There are disadvantages, however, to using animated images. For example, if a user visits a site regularly, the user quickly begins to ignore the animated images. In other words, although animated images can make web pages more appealing to users initially, they typically do not entice the users to return to the web page.

With many web sites, it would be desirable to have users access the web site frequently. Online businesses, for example, would benefit from having users (i.e., customers) return to their web site on a regular basis. Additionally, web sites that display advertisements can obtain more revenue from their advertisers if users regularly visit the web sites.

As a result, there exists a need for mechanisms that entice users to return to a web site on a regular basis.

SUMMARY OF THE INVENTION

Systems and methods consistent with the present invention address this and other needs through the use of an animated story line or a modified/customized company logo ("special event logo") displayed on a web page. The story line may change periodically (e.g., hourly, daily, or weekly) to entice users to repeatedly access the web page to view the next episode in the changing story line. The special event logo may be provided for special occasions, such as holidays and other special events. The special event logo may be selectable by a user and lead to a page of search results related to the holiday or special event.

In accordance with the purpose of the invention as embodied and broadly described herein, a computer-readable medium stores instructions executable by one or more processors to perform a method for attracting users to a web page. The computer-readable medium includes instructions for uploading an initial object in a story line to the web page and instructions for periodically uploading successive objects, following the initial object, to the web page according to the story line.

In another implementation consistent with the present invention, a server includes a memory that is configured to store instructions and a processor. The processor is configured to execute the instructions to upload an initial object in a story line to a site on a network and periodically upload successive objects, following the initial object, to the site according to the story line to entice users to return to the site.

In yet another implementation consistent with the present invention, a method for attracting users to a site on a network includes receiving a plurality of images that tell a story according to a story line and successively displaying the images on the site according to the story line.

In another implementation consistent with the present invention, a method for enticing users to return to a web page includes receiving a plurality of objects that tell a story according to a story line; providing a first one of the objects on the web page for a predetermined amount of time; and providing next ones of the objects on the web page, each for the predetermined amount of time after the first one of the objects.

In a further implementation consistent with the present invention, a method for enticing users to access a web page includes modifying a standard company logo to create a special event logo; associating one or more search terms with the special event logo; uploading the special event logo to the web page; receiving a user selection of the special event logo; and providing search results relating to the special event logo.

In another implementation consistent with the present invention, a computer-readable medium stores instructions executable by one or more processors to perform a method for attracting users to a web page. The computer-readable medium includes instructions for creating a special event logo by modifying a standard company logo; instructions for associating at least one of a link and search results with the special event logo; instructions for uploading the special event logo to the web page; instructions for receiving a user selection of the special event logo; and instructions for providing the link or search results associated with the special event logo.

In yet another implementation consistent with the present invention, a server, connected to a network, includes a memory configured to store instructions and a processor configured to execute the instructions to determine a home page for a web page on the network, identify a standard company logo on the home page, modify the standard company logo with special event information corresponding to a special event to create a special event logo, and replace the standard company logo with the special event logo during the special event.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention entice users to return to a web page by providing a changing animated story line and/or a special event logo on the web page.

Exemplary Network

Figure 1:
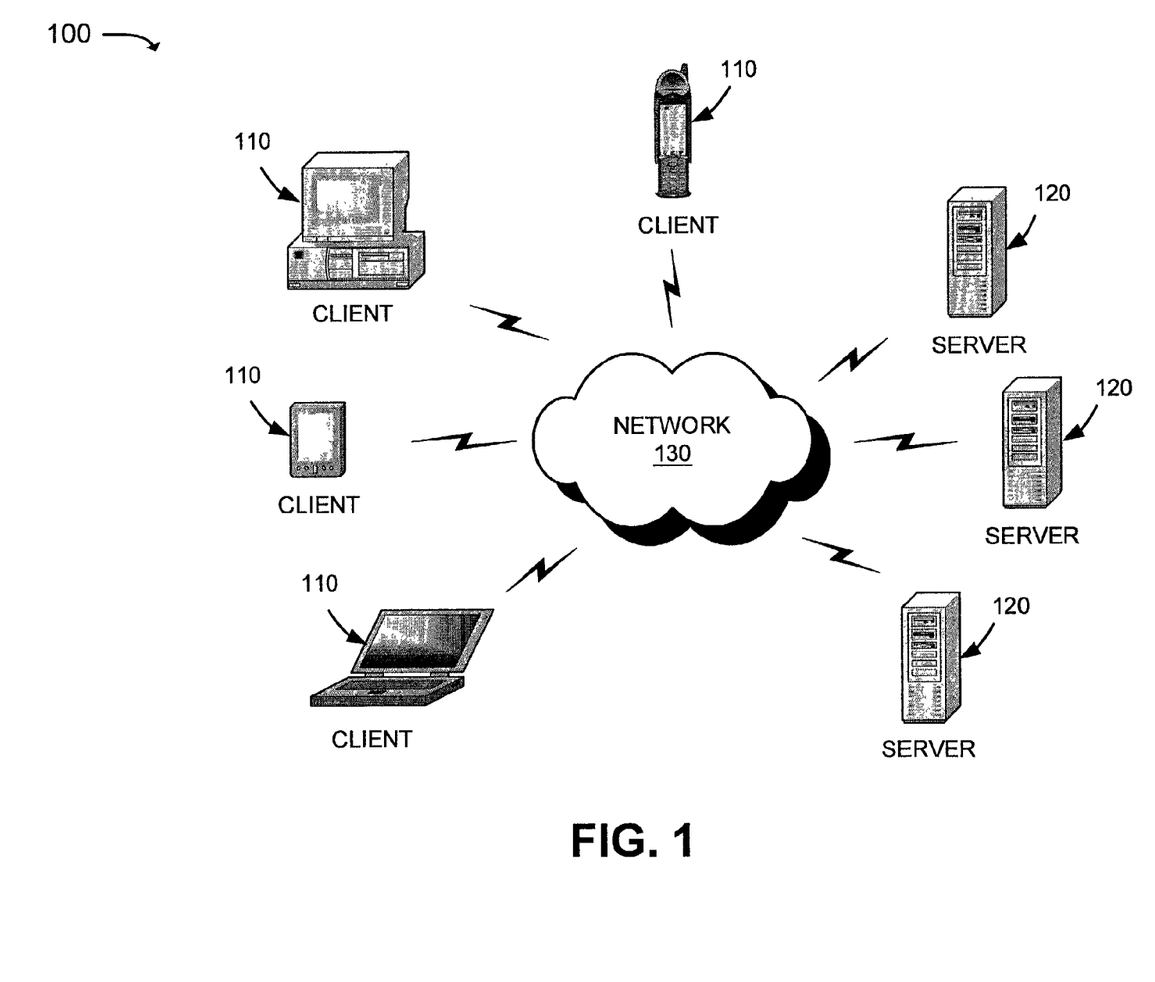
FIG. 1 is a diagram of an exemplary network in which systems and methods consistent with the present invention may be implemented.

FIG. 1 is an exemplary diagram of a network 100 in which systems and methods consistent with the present invention may be implemented. The network 100 may include multiple clients 110 connected to multiple servers 120 via a network 130. The network 130 may include a local area network (LAN), a wide area network (WAN), a telephone network, such as the Public Switched Telephone Network (PSTN), an intranet, the Internet, a similar or dissimilar network, or a combination of networks. Four clients 110 and three servers 120 have been illustrated as connected to network 130 in FIG. 1 for simplicity. In practice, there may be more or less clients 110 and servers 120.

The clients 110 may include devices, such as wireless telephones, personal computers, personal digital assistants (PDAs), lap tops, etc., threads or processes running on these devices, and/or objects executable by these devices. The servers 120 may include server devices, threads, and/or objects that operate or maintain web sites in a manner consistent with the present invention. The clients 110 and servers 120 may connect to the network 130 via wired, wireless, or optical connections.

Figure 2:
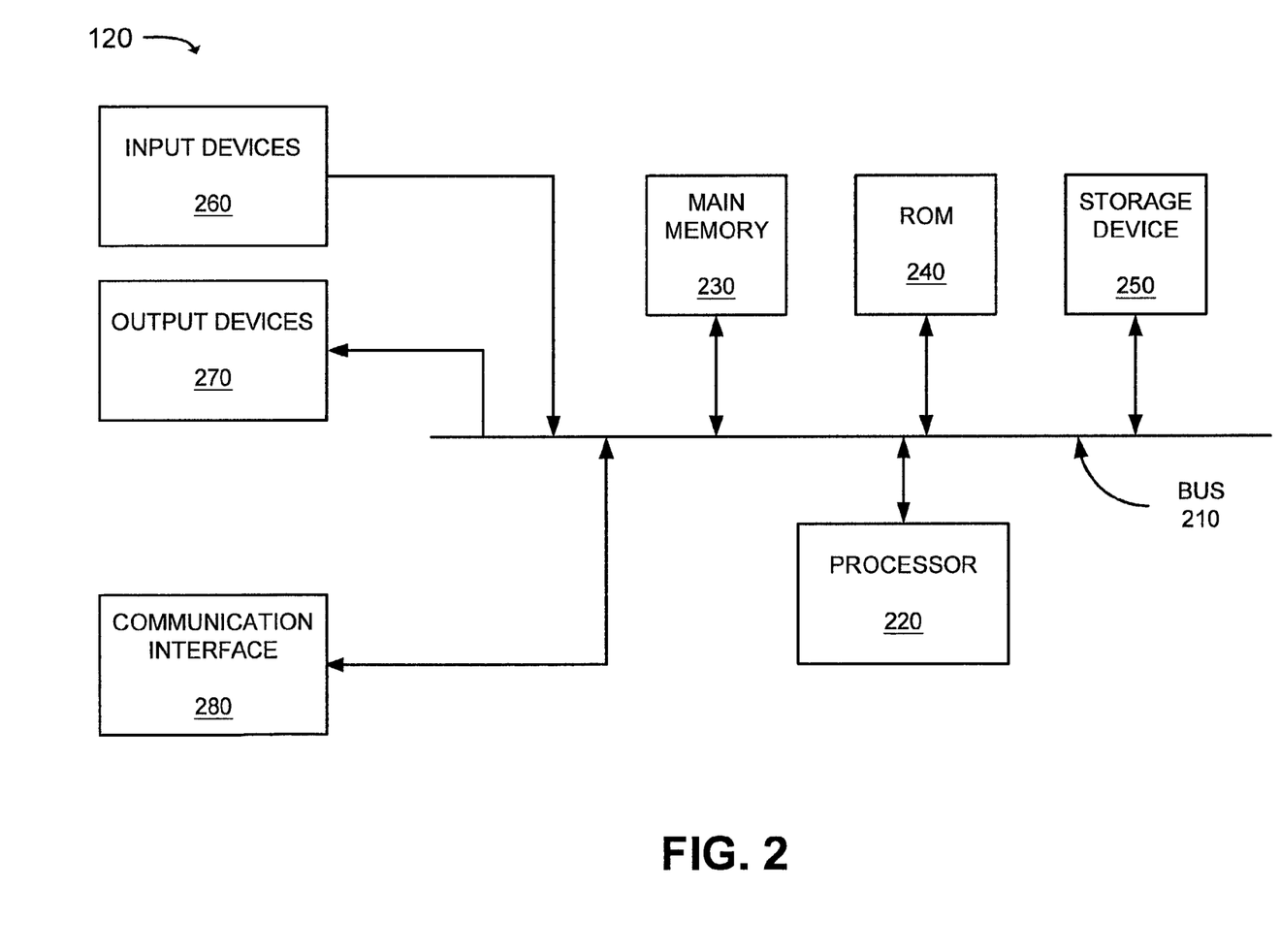
FIG. 2 is an exemplary diagram of a server of FIG. 1 in an implementation consistent with the present invention.

FIG. 2 is an exemplary diagram of a server 120 in an implementation consistent with the present invention. The server 120 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the server 120.

The processor 220 may include any type of conventional processor or microprocessor that interprets and executes instructions. The main memory 230 may include a random access memory (RAM) or another dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit an operator to input information to the server 120, such as a keyboard, a mouse, a pen, voice recognition and/or biometric mechanisms, etc. The output devices 270 may include one or more conventional mechanisms that output information to the operator, including a display, a printer, a speaker, etc. The communication interface 280 may include any transceiver-like mechanism that enables the server 120 to communicate with other devices and/or systems. For example, the communication interface 280 may include mechanisms for communicating with another device or system via a network, such as network 130.

As will be described in detail below, a server 120, consistent with the present invention, provides an animated story line and/or a special event logo on a web page to entice users to return to the web site on a regular basis. The server 120 may perform this task in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Web Page for Animated Story Line

Figure 3:
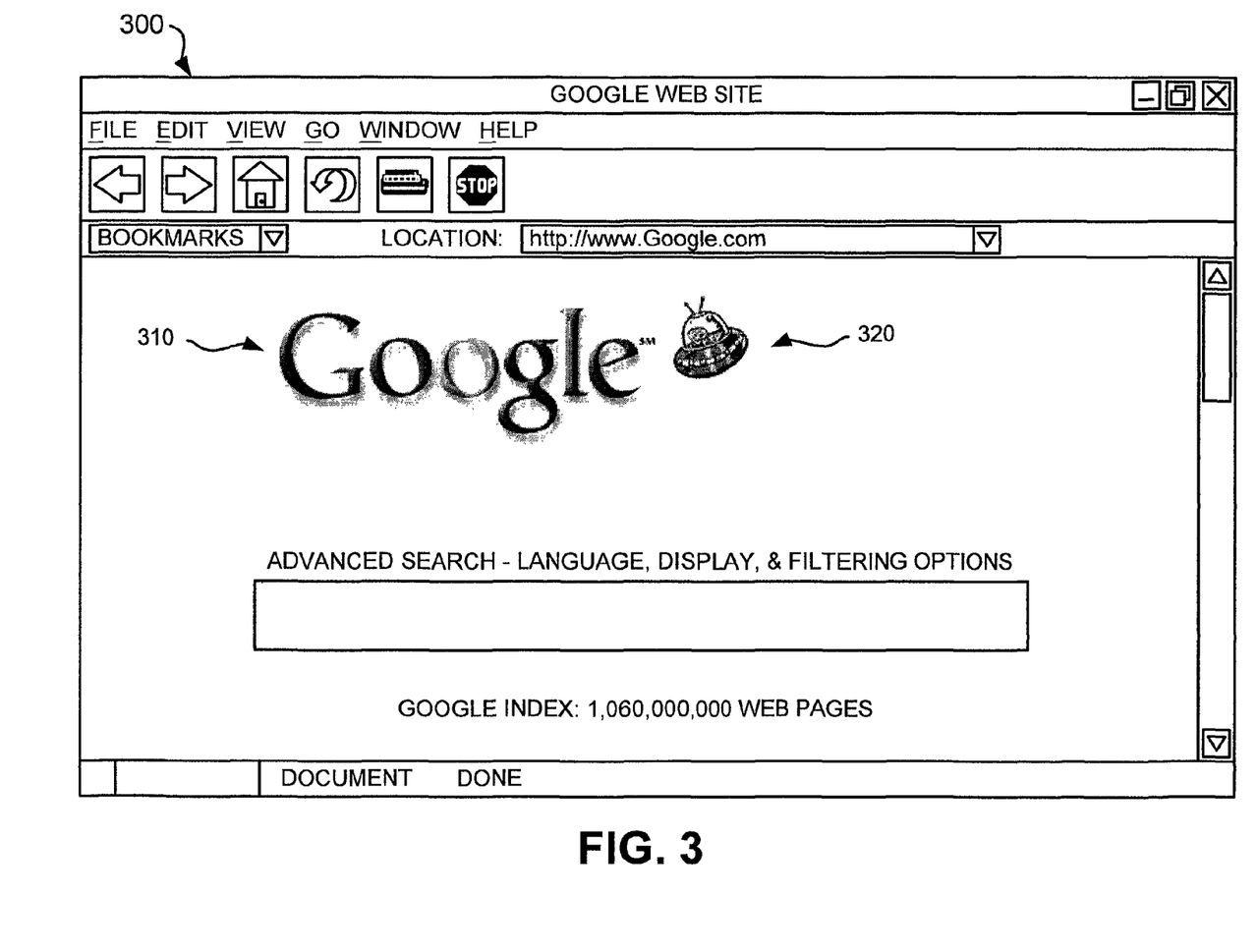
FIG. 3 is a diagram of an exemplary web page for a changing story line according to an implementation consistent with the present invention.

FIG. 3 is a diagram of an exemplary web page 300 maintained by a server 120 according to an implementation consistent with the present invention. The web page 300 may include a company logo 310 and one or more animated objects 320. The animated objects 320 may include images, video, and/or audio information and may be strategically located on the web page 300 to draw users' attention to one or more portions of the web page 300, such as the company's name or an advertiser's display.

According to implementations consistent with the present invention, the server 120 may update the animated objects 320 periodically, such as hourly, daily, weekly, etc., according to an animated story line. For example, the server 120 may periodically upload a new animated object to the web site 300.

Figure 4:
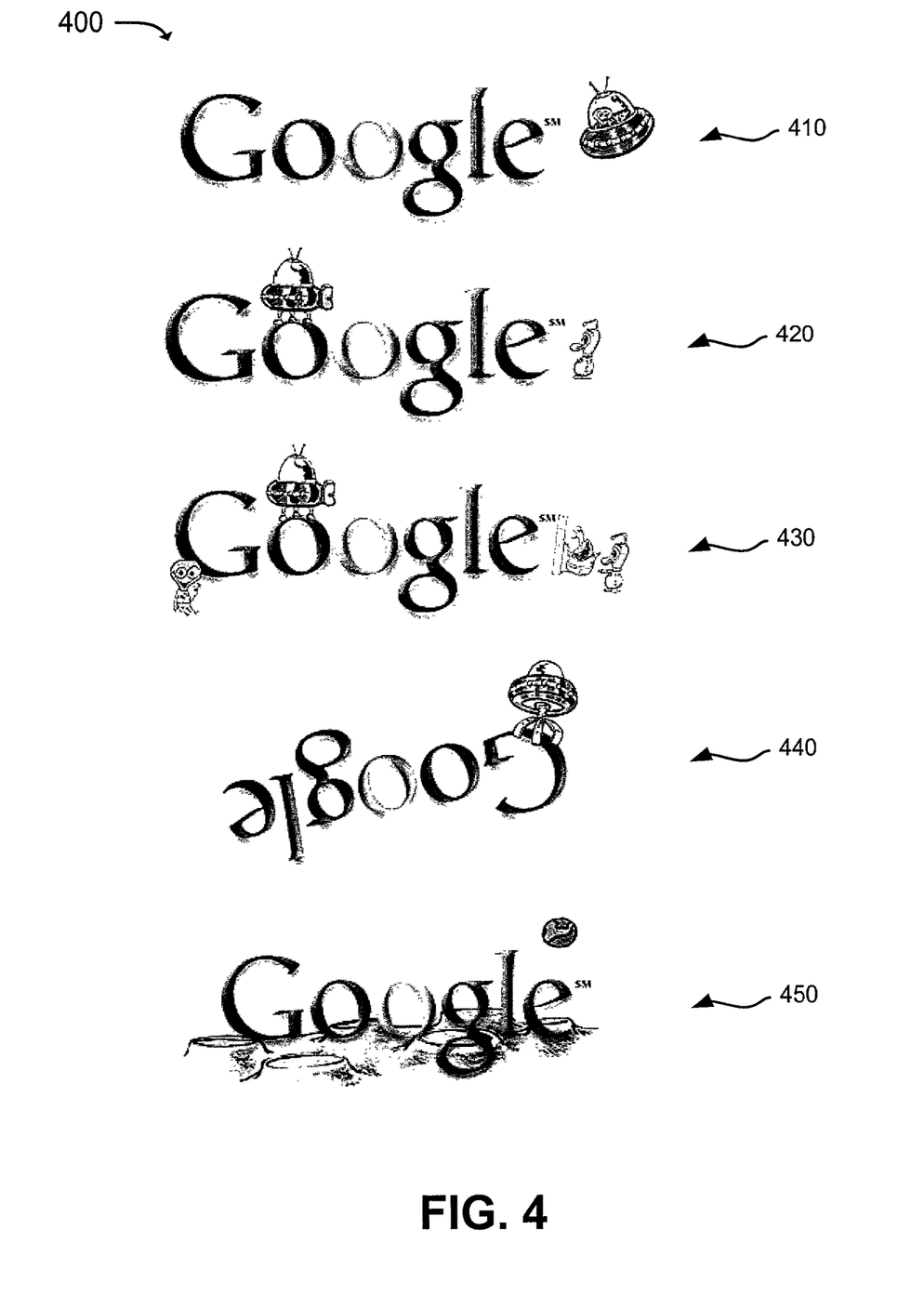
FIG. 4 is an exemplary diagram of a changing story line according to an implementation consistent with the present invention.

FIG. 4 is a diagram of an exemplary story line 400 according to an implementation consistent with the present invention. In this example, the story line 400 involves aliens that steal a company's logo and includes five animated images 410-450. The animated image 410 represents the beginning of the story and shows an alien spacecraft approaching the company logo. The animated image 420 shows the alien spacecraft landing on the company logo and an alien inspecting the logo. The animated image 430 shows the aliens leaving their spacecraft to further inspect the company logo. The animated image 440 shows the aliens hauling away the company logo with their spacecraft. Finally, the animated image 450 shows the company logo after being deposited on another world by the aliens.

Figure 5:
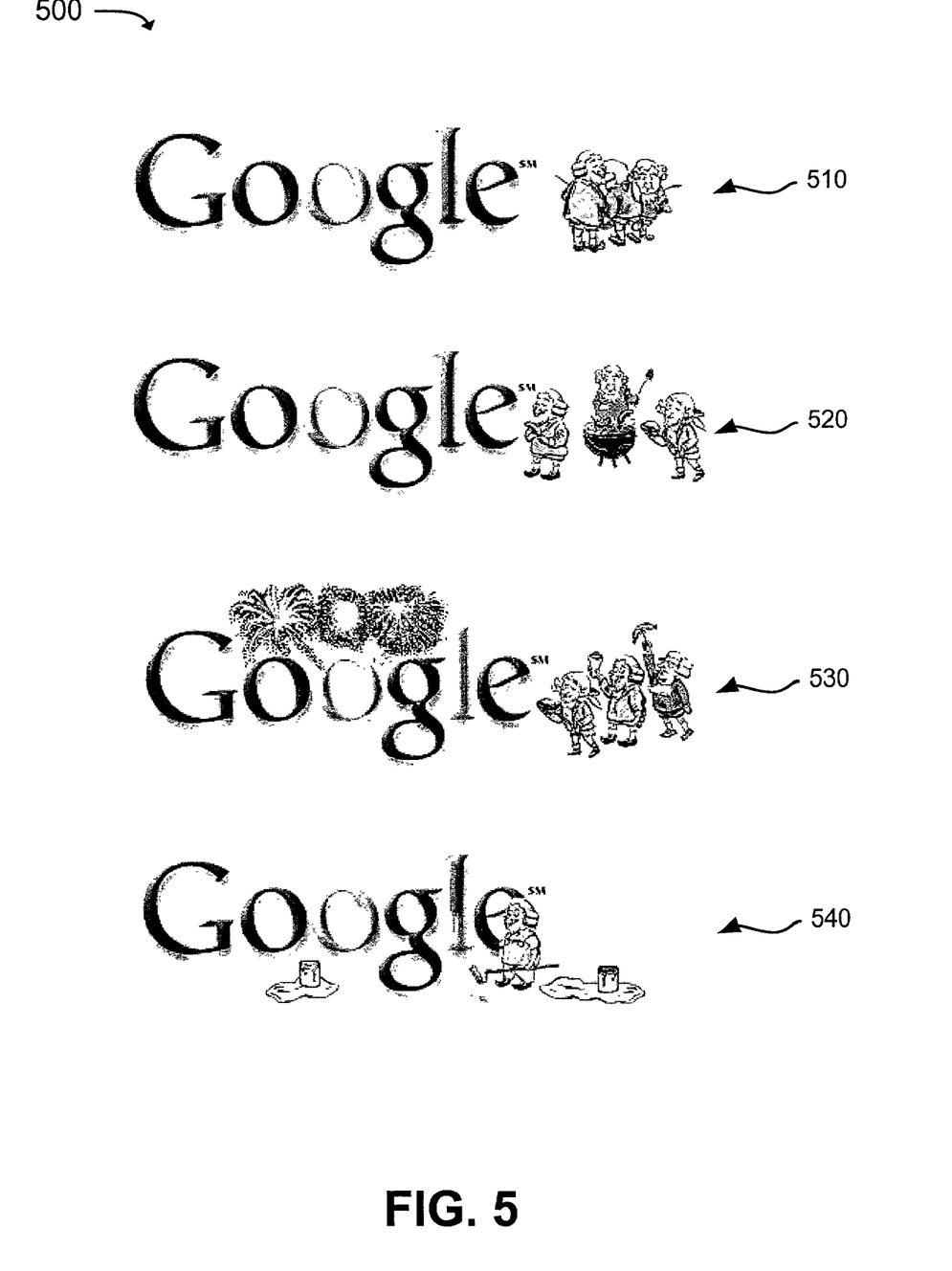
FIG. 5 is an exemplary diagram of another changing story line according to an implementation consistent with the present invention.

FIG. 5 is a diagram of another exemplary story line 500 according to an implementation consistent with the present invention. In this example, the story line 500 involves the founding fathers celebrating the Fourth of July and includes four animated images 510-540. The animated image 510 represents the beginning of the story and shows the founding fathers executing the Declaration of Independence. The animated image 520 shows the founding fathers celebrating the execution of the Declaration of Independence with a cookout. The animated image 530 shows the founding fathers watching fireworks that have the effect of removing the color from a company's logo. Finally, the animated image 540 shows one of the founding fathers repainting the company logo.

Exemplary Processing for Animated Story Line

Figure 6:
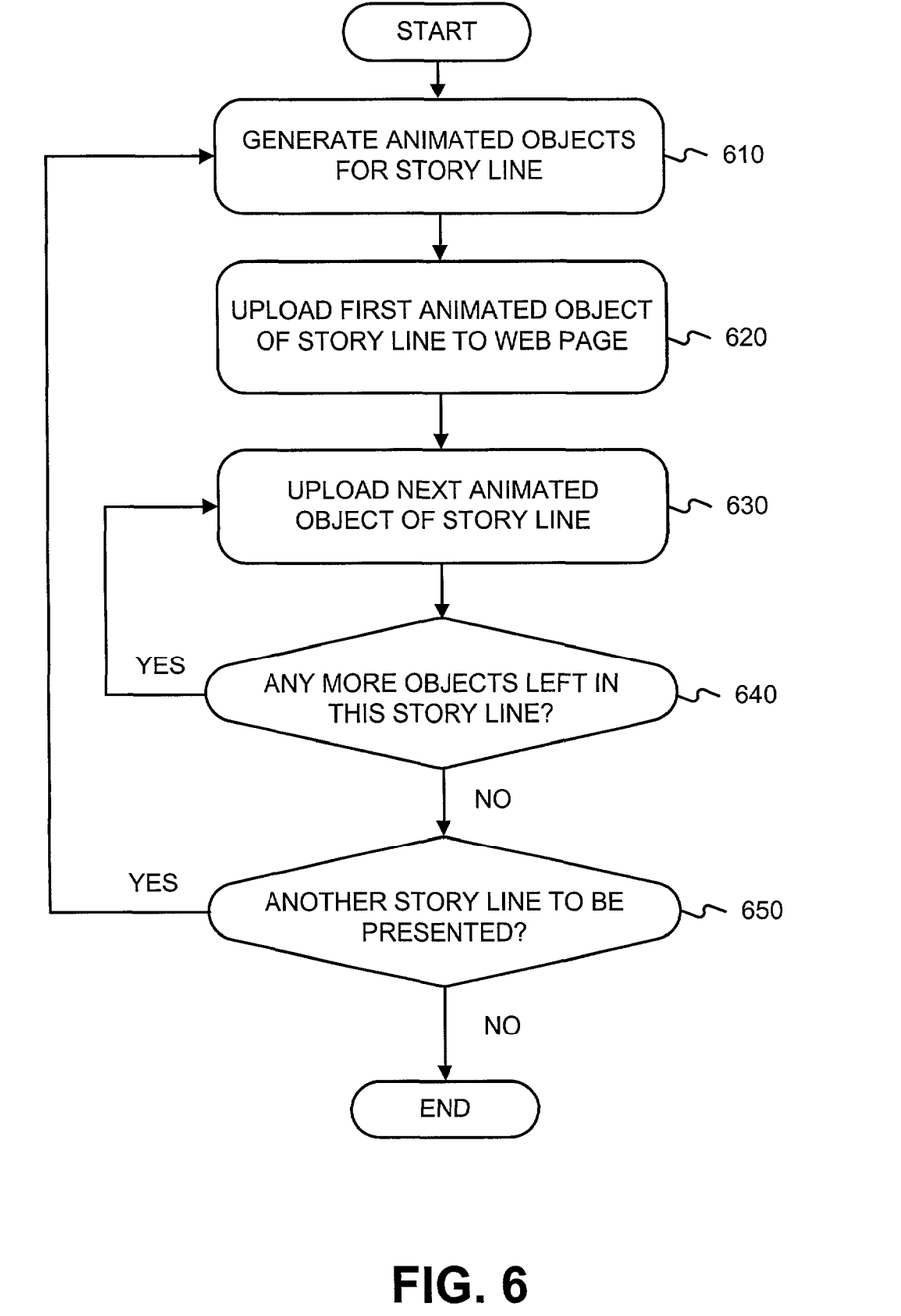
FIG. 6 is a flowchart of processing for enticing users to return to a web page using a changing story line in accordance with an implementation consistent with the present invention.

FIG. 6 is a flowchart of processing for enticing users to return to a web page using a changing story line according to an implementation consistent with the present invention. Processing may begin with the generation of animated objects for a story line [act 610]. The animated objects may be generated using conventional techniques and software and stored as a single object file or as multiple object files on the server 120 (FIG. 1). The object file(s) may be downloaded to the server 120 at one time or over a period of time using, for example, a computer-readable medium, such as a removable memory or a network transmission.

When at least the first animated object in the story line is completed, the first animated object may be uploaded to the web page [act 620]. The first animated object may then be viewable or accessible on the web page via a network, such as network 130. Then after a predetermined or random amount of time, such as an hour, day, week, etc., the next animated object in the story line may be uploaded to the web page [act 630]. If there are more animated objects to be loaded [act 640], these objects may be uploaded to the web page after each passing of the predetermined or random amount of time [act 630]. If no more animated objects remain [act 640], it may be determined whether another story line is to be presented [act 650]. If another story line is to be presented, then processing may continue at act 610 with the generation of the animated objects for that story line. If no other story line is to be presented, processing may end.

The foregoing processing may be performed automatically by the server 120 or one or more devices connected directly or indirectly (i.e., via a network) to the server 120. Alternatively, some of the acts may be performed by one or more human operators.

Also, while systems and methods have been described for presenting animated objects of a story, other types of information may be presented to entice users to return to a web page. For example, video data, audio data, and/or a series of pictures may be used. It has also been described that a single animated object may be uploaded to the web page periodically and presented (e.g., displayed) for a predetermined or random amount of time. Alternatively, a series of animated objects may be uploaded and presented at the same time to form a sort of cartoon that tells a story.

Exemplary Web Page for Special Event Logo

Figure 7:
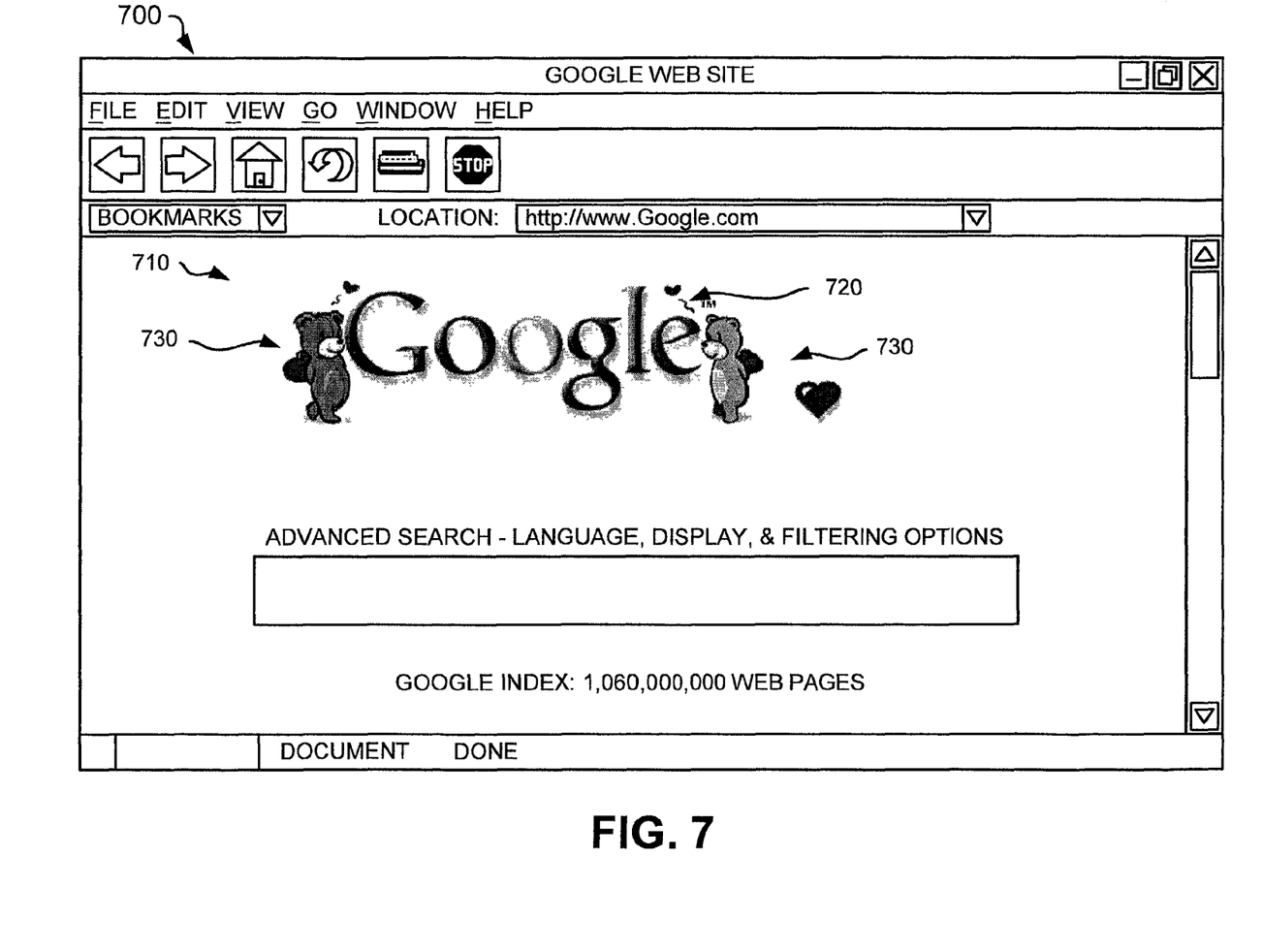
FIG. 7 is a diagram of an exemplary web page for a special event logo according to an implementation consistent with the present invention.

FIG. 7 is a diagram of an exemplary web page 700 maintained by a server 120 according to an implementation consistent with the present invention. The web page 700 may include a special event logo 710. The special event logo 710 may include a standard company logo 720 modified or customized with one or more animated objects 730. The animated objects 730 may include images, video, and/or audio information and may be strategically located next to or integrated with the logo 720 to draw users' attention to the company's name or, perhaps, an advertiser's display.

According to implementations consistent with the present invention, the server 120 may provide the special event logo 710 for holidays and other special events. For example, the special event logo 710 shown in FIG. 7 relates to Valentine's Day.

The server 120 may also provide one or more search terms, one or more links to a document, or search results relating to the special event logo 710. Therefore, when a user selects (e.g., clicks on) the special event logo 710, the server 120 may provide a page of a document, such as a web site, or search results relating to the holiday or special event for which the special event logo 710 was provided. In the example shown in FIG. 7, selection of the special event logo 710 may lead to a page containing search results relating to Valentine's Day.

Figure 8:
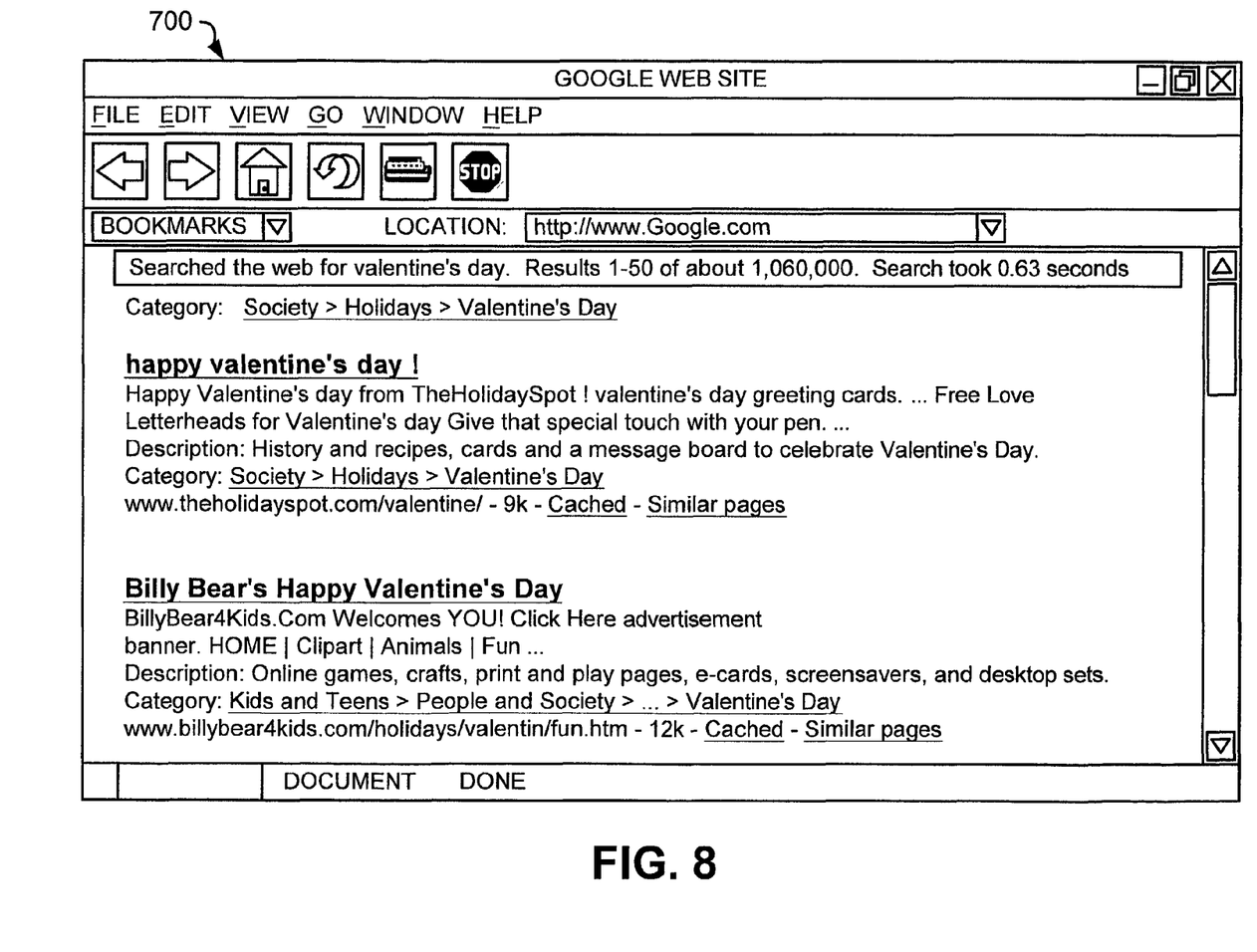
FIG. 8 is an exemplary diagram of search results that may be provided in response to selection of the special event logo of FIG. 7 according to an implementation consistent with the present invention.

FIG. 8 is an exemplary diagram of search results that may be provided in response to selection of the special event logo 710 according to an implementation consistent with the present invention. As shown, the search results contain links to one or more documents relating to Valentine's Day.

Figure 9:
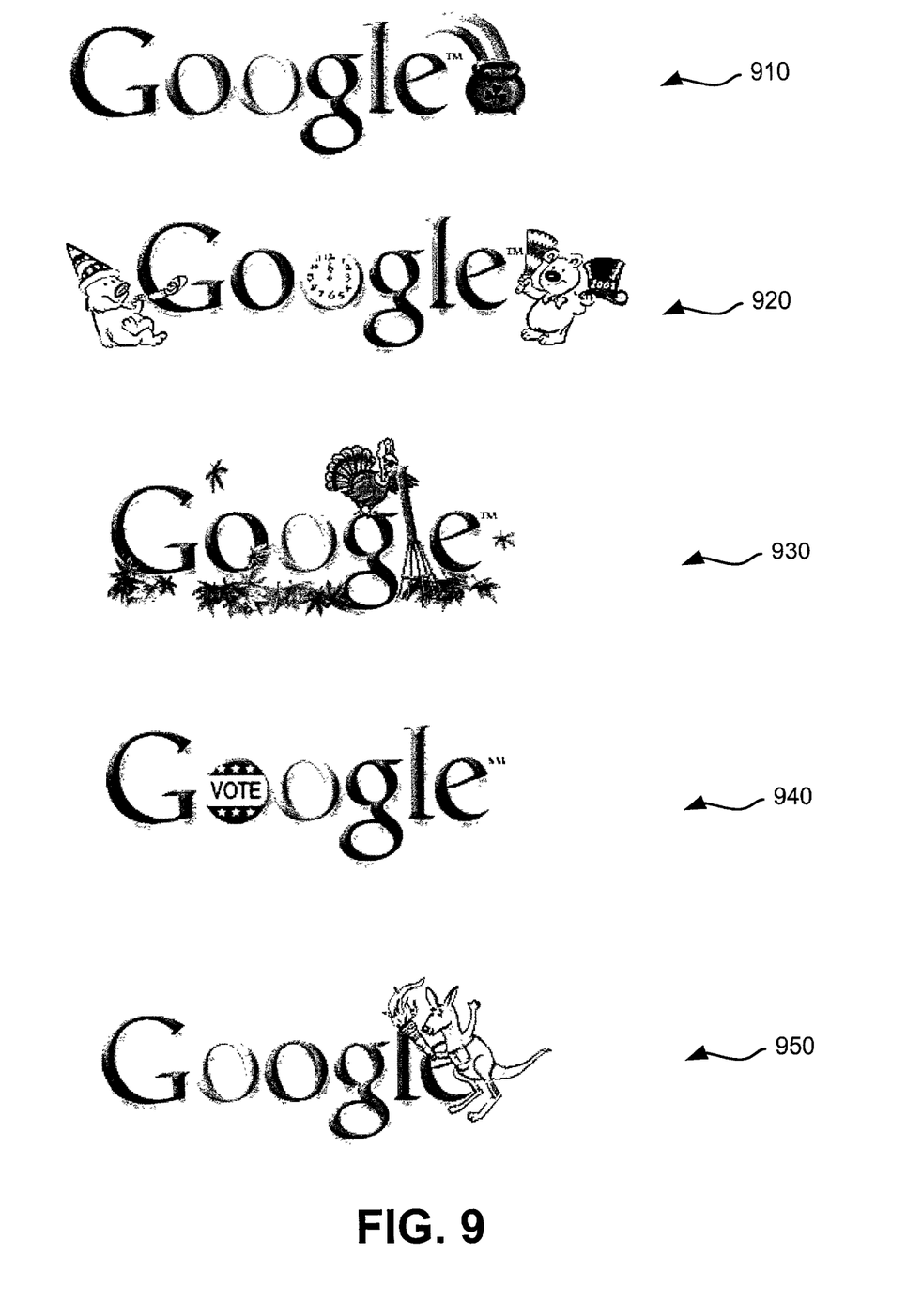
FIG. 9 is a diagram of examples of special event logos according to implementations consistent with the present invention.

FIG. 9 is a diagram of examples 910-950 of special event logos according to implementations consistent with the present invention. In the example 910, a company logo is modified with a leprechaun's pot of gold for Saint Patrick's Day. In the example 920, a company logo is modified with animated characters celebrating New Year's Day. In the example 930, a company logo is modified with a turkey for Thanksgiving. In the example 940, a company logo is modified with a voter's button for Election Day. Finally, in the example 950, a company logo is modified with an animated character for the Olympics.

Exemplary Processing for Special Event Logo

Figure 10:
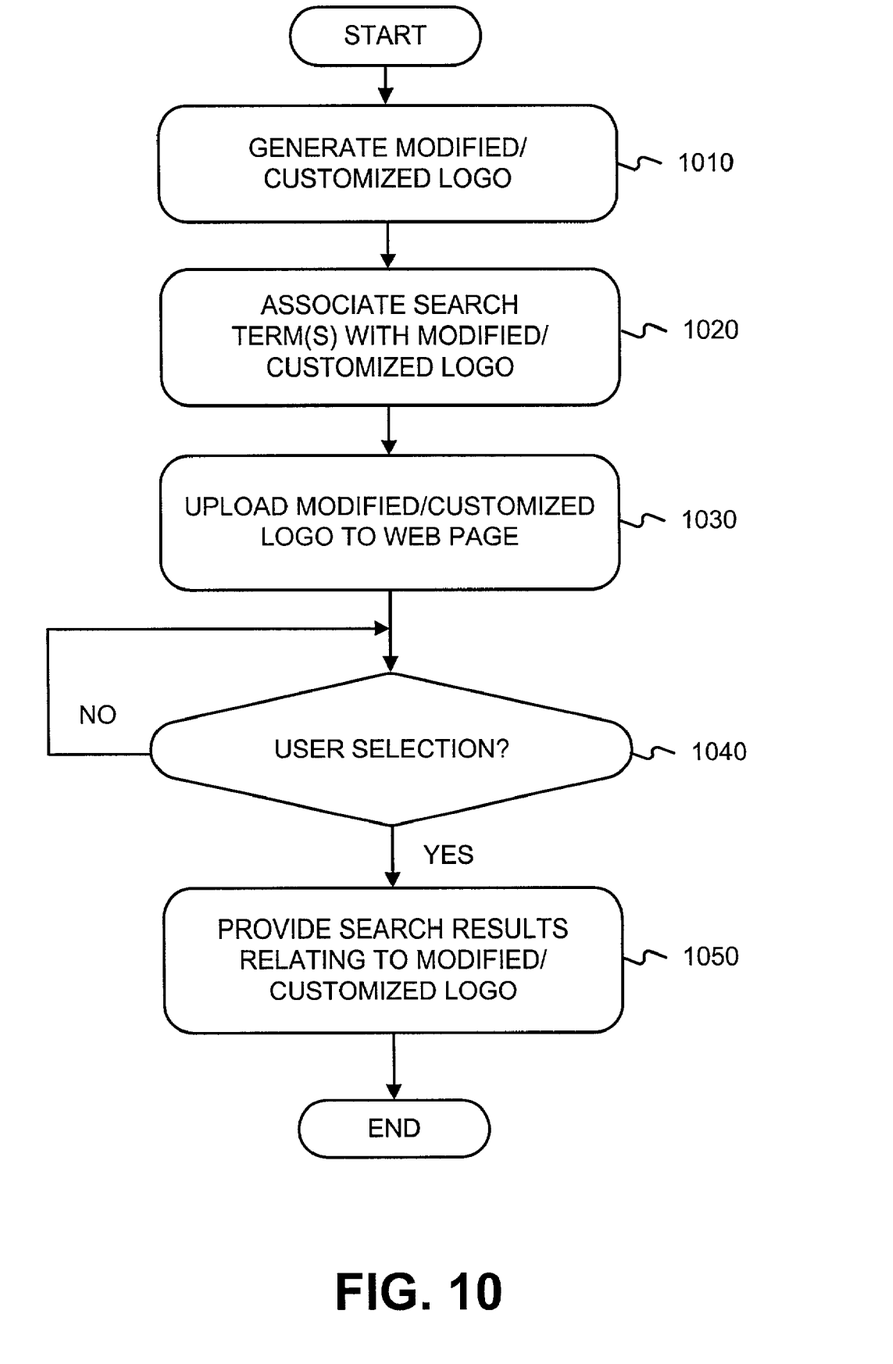
FIG. 10 is a flowchart of processing for enticing users to return to a web page using a special event logo in accordance with an implementation consistent with the present invention.

FIG. 10 is a flowchart of processing for enticing users to return to a web page using a special event logo according to an implementation consistent with the present invention. Processing may begin with the generation of a modified or customized company logo [act 1010]. A standard company logo on a web site, for example, may be modified or customized with one or more animated objects for a special occasion, such as a holiday or special event. The animated object(s) may be separate from the company logo or may be integrated therewith. The special event logo may be generated using conventional techniques and software and stored as a single object file or as multiple object files on the server 120 (FIG. 1). The object file(s) may be downloaded to the server 120 at one time or over a period of time using, for example, a computer-readable medium, such as a removable memory or a network transmission.

To generate a modified or customized logo, the server 120 may identify a home page for a document, such as a web site, on a network, such as the Internet. The server 120 may then locate the standard logo used on the home page to identify the operator of the web site. The server 120 may modify the standard logo with one or more animated objects.

The server 120 may associate one or more search terms with the special event logo [act 1020]. For Valentine's Day, for example, the search terms of "valentine's day" may be associated with the special event logo. In an alternative implementation consistent with the present invention, the server 120 may associate a document, such as a web page, or search results with the special event logo.

The server 120 may upload the special event logo to the web page [act 1030]. For example, the server 120 may upload the special event logo when the special occasion corresponding to the special event logo occurs. The server 120 may leave the special event logo on the web page for one or more days corresponding to the special occasion or may periodically change the special event logo during the one or more days of the special occasion.

At some point, a user may select the special event logo by, for example, clicking on the logo using an input device, such as a mouse [act 1040]. If user selection occurs, the server 120 may use the associated search term(s) to generate a search query. The server 120 may use the search query to search an index, a directory, or a network, such as the Internet. The server 120 may then provide search results relating to the special event logo to the user [act 1050].

In an alternative implementation, the server 120 uses the document or search results previously associated with the special event logo as the search results relating to the special event logo. In this case, the server 120 may simply retrieve the document or search results from memory.

The foregoing processing may be performed automatically by the server 120 or one or more devices connected directly or indirectly (i.e., via a network) to the server 120. Alternatively, some of the acts may be performed by one or more human operators.

Also, while systems and methods have been described for using one or more animated objects to modify or customize a company logo, other types of information may be used to entice users to return to a web page. For example, video and/or audio data may be used.

CONCLUSION

Systems and methods consistent with the present invention provide mechanisms to entice users to return to a web page by presenting animated objects that change in time to tell a story and/or a company logo modified or customized for a special occasion. In this manner, users are encouraged to access the web page to view the story and/or the special event logo.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 6 and 10, the order of the acts may be modified in other implementations consistent with the present invention.

The scope of the invention is defined by the claims and their equivalents.

What is claimed is:

1. A non-transitory computer-readable medium that stores instructions executable by one or more processors to perform a method for attracting users to a web page, comprising:
   instructions for creating a special event logo by modifying a standard company logo for a special event, where the instructions for creating the special event logo includes instructions for modifying the standard company logo with one or more animated images;
   instructions for associating a link or search results with the special event logo, the link identifying a document relating to the special event, the search results relating to the special event;
   instructions for uploading the special event logo to the web page;
   instructions for receiving a user selection of the special event logo; and
   instructions for providing the document relating to the special event or the search results relating to the special event based on the user selection.

2. The computer-readable medium of claim 1, wherein the instructions for creating a special event logo further include:
   instructions for modifying the standard company logo with at least one of video or audio data.

3. The computer-readable medium of claim 1, wherein the instructions for creating a special event logo further include: instructions for modifying the standard company logo with information associated with a holiday.

4. The computer-readable medium of claim 1, wherein the instructions for uploading the special event logo include: instructions for replacing the standard company logo with the special event logo on the web page.

* * * * *